United States Patent [19]
Ewald, Jr.

[11] Patent Number: 4,806,237
[45] Date of Patent: Feb. 21, 1989

[54] WASTE REMOVAL APPARATUS

[76] Inventor: Herbert J. Ewald, Jr., 615 Avenue A, Karnes City, Tex. 78118

[21] Appl. No.: 99,711

[22] Filed: Sep. 22, 1987

Related U.S. Application Data

[63] Continuation-in-part of Ser. No. 856,231, Apr. 28, 1986, which is a continuation-in-part of Ser. No. 674,289, Nov. 23, 1984, abandoned.

[51] Int. Cl.⁴ .............................................. E04H 3/16
[52] U.S. Cl. ................................ 210/169; 210/320; 210/199; 210/220; 119/3
[58] Field of Search ............. 210/169, 320, 150, 199, 210/151, 220; 119/3

[56] References Cited

U.S. PATENT DOCUMENTS

| | | | |
|---|---|---|---|
| 4,043,299 | 8/1977 | Birkbeck et al. | 119/3 |
| 4,067,809 | 1/1987 | Kato | 210/169 |
| 4,093,546 | 6/1978 | Taborsky | 119/3 |
| 4,141,823 | 2/1979 | Smith et al. | 210/150 |
| 4,687,575 | 8/1987 | Grose | 210/169 |

Primary Examiner—Richard V. Fisher
Assistant Examiner—Coreen Y. Lee Lee
Attorney, Agent, or Firm—Vaden, Eickenroht, Thompson & Boulware

[57] ABSTRACT

Apparatus for use in removing waste from a fish culture system including a tank through which water from the system may be circulated, filters mounted in upright and spaced apart relation across the tank so that the water circulates successively through them, and tubes for injecting air into the water on the upstream side of each filter.

11 Claims, 4 Drawing Sheets

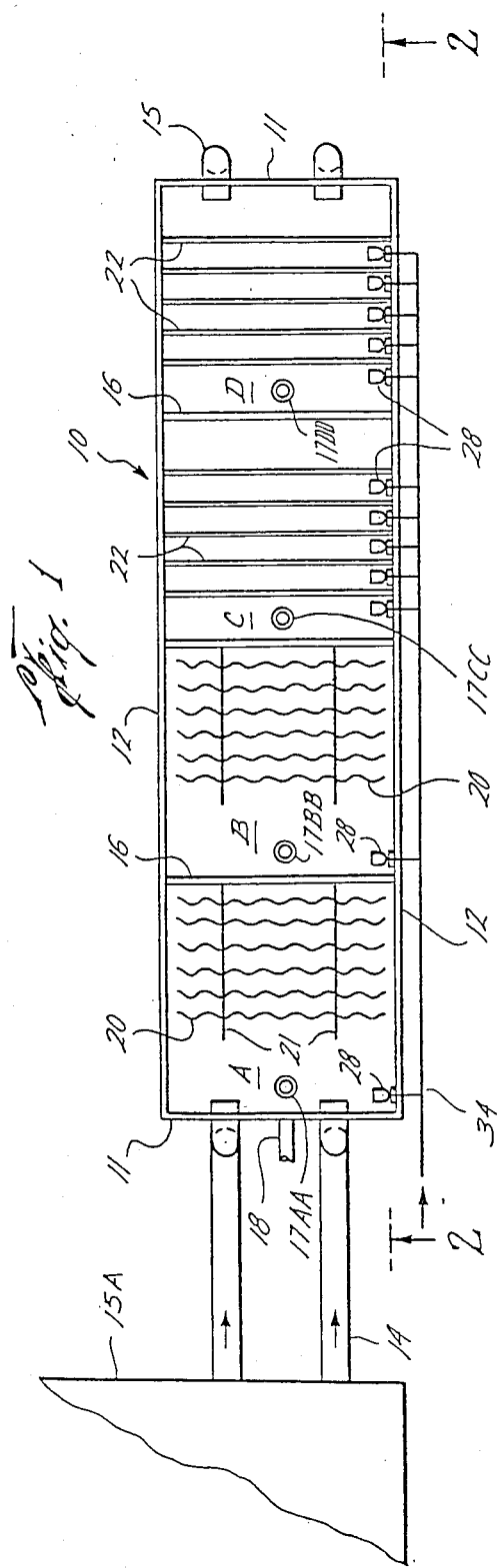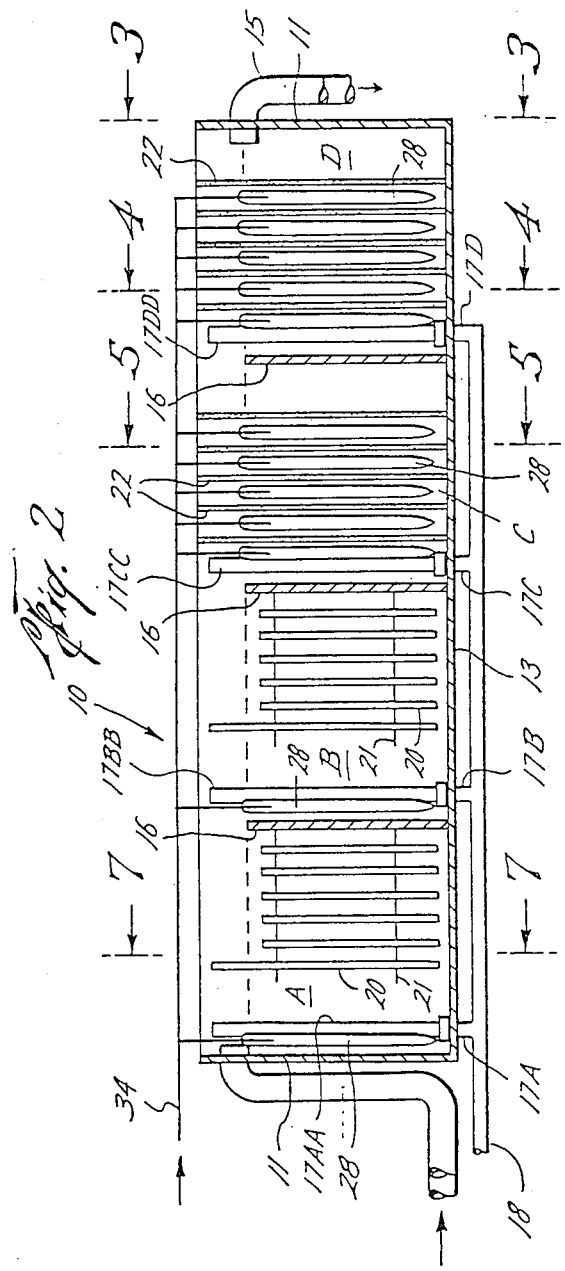

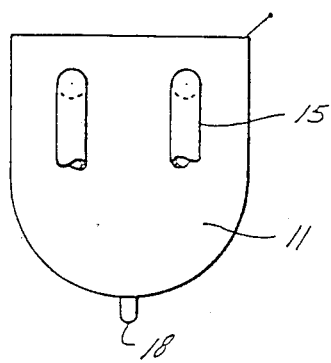
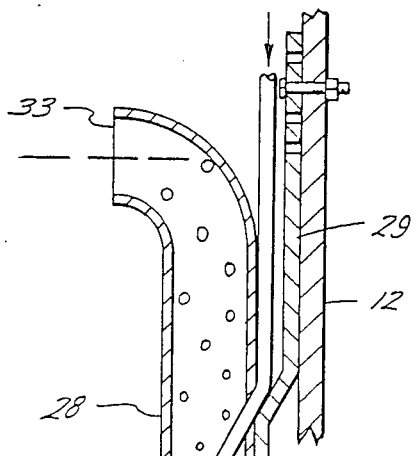
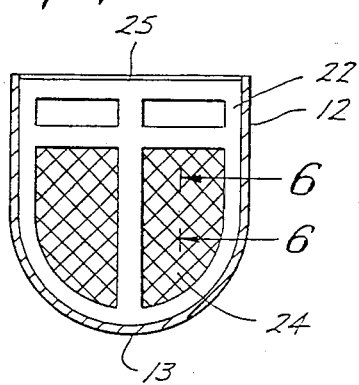
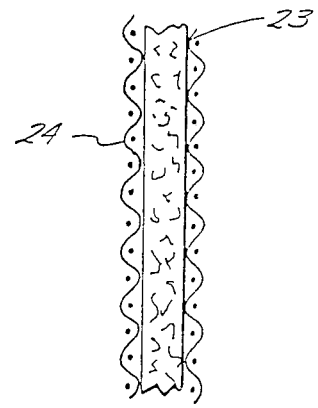
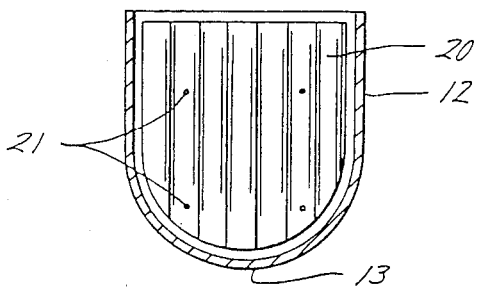

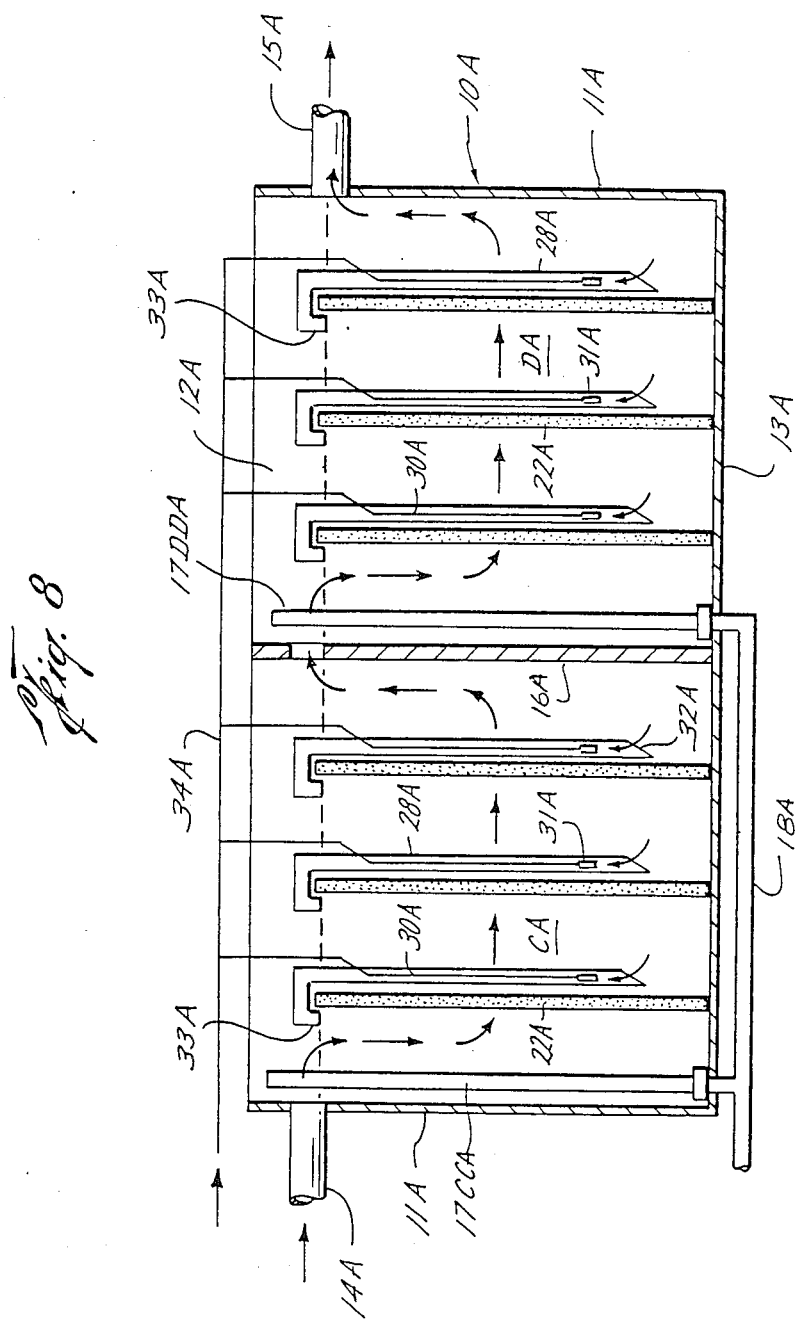

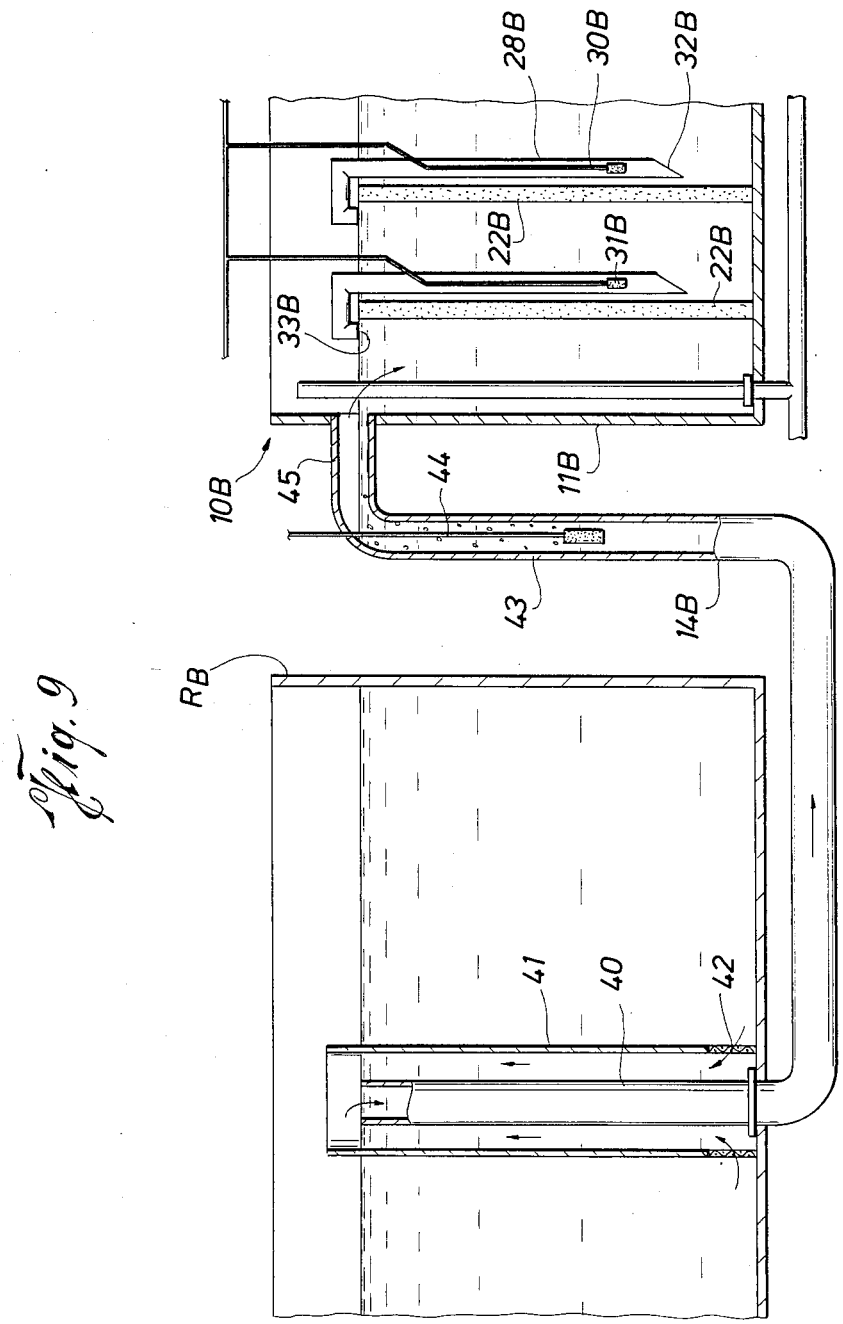

WASTE REMOVAL APPARATUS

This application is a continuation-in-part of my co-pending application, Ser. No. 856,231, filed Apr. 28, 1986, and entitled "Waste Removal Apparatus", which latter application was in turn a continuation-in-part of then co-pending application, Ser. No. 674,289, filed Nov. 23, 1984, and entitled "Waste Removal Apparatus", now abandoned.

This invention relates to improved apparatus for use in removing waste from a fish culture system.

In a system of this type, whether for breeding or grow out purposes, or both, the water becomes contaminated with excrement, excess food and other waste material. The resulting dissolved organic substances, such as ammonia, nitrites and nitrates, will, unless removed, starve the fish of oxygen, causing the fish to be killed or diseased, and/or starve the water of oxygen, causing the fish to starve and promoting otherwise dormant fish diseases.

A large concentration of fish in the system thus requires that the waste material, and particularly the dissolved organic substances, be continuously removed. Conventional systems for removing the material have not been found adequate for this purpose, particularly in systems which are indoors and thus where surface area is at a premium. It is therefore the primary object of this invention to provide such apparatus which is capable of removing large amounts of waste material, and particularly dissolved organic substances, but which occupies relatively little ground area, and which is relatively inexpensive to manufacture and easy to maintain.

This and other objects are accomplished, in accordance with the illustrated embodiments of this invention, by apparatus which includes a tank through which water from the fish culture system may be circulated, and a plurality of filters mounted in upright and spaced apart positions across the tank so that the water circulates successively through them. Each such filter includes a relatively thin layer of porous filtering media having a large surface area on which bacteria from the dissolved organic substances in the water will grow, and a means is provided for injecting air into the water on the upstream side of each filter so as to agitate the water and add oxygen thereto for promoting the bacterial growth on the filter media. More particularly, means are provided for maintaining the water in the tank at substantially the level of the upper edges of the filter media, and each layer of filter media is removably mounted in the tank so that it may be cleaned as it is clogged by the accumulation of the bacterial growth thereon.

Since the filters are mounted in upright positions, and relatively close together, they provide large surface areas on which bacteria may grow with a minimum ground area requirement. The addition of air to the water on each upstream side of the filter will promote maximum bacterial growth on each successive filter by replenishing the oxygen removed from the water due to the bacterial growth upon the preceding filter. The maintenance of the water in the tank at substantially the level of the upper edges of the filter media enables optimal use of the surface areas of the filters and, in the event one filter becomes logged, water is free to flow over its upper edge so that the process may continue both prior to and during its removal for cleaning.

In certain embodiments of the invention, the water level is maintained not only by the levels of the water inlet and outlet, but also by one or more weirs which are mounted across and secured to the sides of the tank to provide support therefore as well as to reduce the rate of flow of the water through the tank and thus promote settling of waste. In this same connection, baffles may also be arranged within the tank upstream of the filters to further promote the settling of solid waste particles prior to circulation of the water through the filters.

The air injecting means includes a series of tubes each individually mounted on the tank with an inlet in its lower end near the bottom of the tank, and an air line extending into the tube for injecting air into the water near its lower end. Thus, each such tube may be removed or replaced for repair purposes without disturbing the filters or the other tubes. Preferably, the upper, outlet end of each tube opens at generally the level of the water, which has been found to promote maximum agitation and oxygenation of the water. In one embodiment, the inlet to each tube is, like its outlet, on the upstream side of the filter. In another embodiment, however, the inlet is on the downstream side of the filter so that air is injected into water which has already circulated through the filter.

As illustrated, each filter also includes screens on opposite sides of the layer of filter media, and the filter media comprises woven polyester or any other suitable inexpensive, readily washable material having a surface area considerably larger than that of its one side facing the water flow. The screens are of any suitable non-corrosive material such as plastic compatible with the water.

In the drawings, wherein like reference characters are used throughout to designate like parts:

FIG. 1 is a top plan view of apparatus constructed in accordance with the present invention, including a tank having filters mounted thereacross and piping for circulating water from a component of the fish culture system into and through the tank and the bitters thus for return to the system;

FIG. 2 is a longitudinal, sectional view of the tank, as seen along broken line 2—2 of FIG. 1, and showing means constructed in accordance with the first described embodiment of the invention for injecting air into the water on the upstream sides of the filters;

FIG. 3 is an elevational view of the outlet end of the tank, as seen along broken lines 3—3 of FIG. 2;

FIG. 4 is an enlarged cross sectional view of a portion of the tank illustrating the tube through which air is injected into the water on the upstream side of each filter;

FIG. 5 is a cross sectional view of the tank, as seen along broken lines 5—5 of FIG. 2, and showing in elevation the back side of a filter;

FIG. 6 is a sectional view of a portion of a filter showing, on an enlarged scale, the layer of filter media disclosed between screens on each side; and FIG. 7 is another cross sectional view of the tank, as seen along broken lines 7—7 of FIG. 2, and illustrating the back side of one of the baffles;

FIG. 8 is a longitudinal sectional view, similar to FIG. 2, of a tank in which air is injected into the water upstream of each of the filters in tank by tubes constructed and arranged in accordance with the second described embodiment of the invention; and FIG. 9 is a longitudinal section view of the front end of a tank similar to that shown in FIG. 8, as well as the rear end of a raceway or breeding tank and a pipe extending between the outlet from the raceway to the inlet to the filter tank.

With reference now the details of the above described drawings, the tank shown in each of FIG. 1 and 2, and designated in its entirety by reference character 10, is of elongate construction having vertical walls 11 at each end, oppositely facing side walls 12, and a bottom wall 13 which is curved to cause solid waste particles to slide downwardly within the tank toward its lowermost point. Pipes 14 from a raceway or breeding tank R of the fish culture system extend through the inlet end wall 11 of the tank for introducing water from the system into the tank near its upper end. Following circulation through the tank, the water passes through pipes 15 extending through the outlet end wall of the tank near its upper end for return to another component of the fish culture system and ultimately back to the raceway or breeding tank.

Weirs 16 extend across and are secured to the sides of the tank intermediate its ends to divide it into four longitudinally successive compartments A, B, C and D in which the water in the tank is maintained at substantially the level of the upper edges of the weirs, which are in turn at substantially the level of the inlet and outlet pipes 14 and 15. The water and waste material in each compartment may be drained therefrom through a drain pipe 17A, 17B, 17C and 17D in the lowermost point of each compartment leading to a common drain line 18. Stand pipes 17AA, 17BB, 17CC and 17DD are removably disposed in the upper ends of the drain pipes so as to normally close same.

The compartments A and B are for the purpose of causing solid waste particles in the water to settle out onto the bottom of the tank. For this purpose, baffles 20 are mounted across the tank, with successive baffles in each compartment being closely spaced apart from one another, and with the side and lower edges of the baffles spaced from the side edges and bottom of the tank so as to promote circulation of water over and between them as they pass through each of the compartments A and B. As shown, the leading or upsteam baffle in each compartment extends above the water level, and the upper edges of successive baffles are below the water level.

These baffles may of be any suitable, inexpensive material compatible with the water, such as fiberglass reinforced plastic, and are preferably of wavy configuration to further promote water circulation. They are supported in the positions shown by means of rods 21 extending longitudinally within the compartments A and B of the tank. Thus, as shown in FIG. 7, holes are drilled in each baffle to permit it to be moved onto supported position on the rods.

The compartments C and D, on the other hand, are for the purpose of removing dissolved organic substances in the water by bacterial growth. Thus, a plurality of filters 22 are mounted in upright and spaced apart positions across the tank within each compartment so that water passing over the weirs 16, and through the compartment, will circulate successively through the filters. That is, as shown in FIG. 5, each filter has side edges and a bottom edge which conform closely to the side walls and bottom of the tank.

As previously described, and as shown in FIG. 6, each filter includes a relatively thin layer of filtering media 23 on which bacteria from the dissolved organic substances in the water will grow, and screens 24 on opposite sides of the filtering media and secured thereto by means of a frame 25. As shown in FIG. 5, the frame has hand holes above the upper edge of the layer 25 to permit the filtering media to be easily removed from or mounted within the tank. The carrier has opposite sides which are secured to one another, as well as the filtering media and screens, so as to hold them in place, and has side edges and a bottom edge which are adapted to fit closely within the side walls and the bottom of the tank.

As previously described, the layer of filtering media of each filter comprises a material, such as woven or fiberglass matting, which provides surface areas many times that of the area on the face of the layer. Thus, even though the bacteria will not grow on the layer of filtering media for a depth of more than one inch or so, the media nevertheless provides surface areas on which large amounts of the bacteria will grow before the filter becomes clogged and must be removed for cleaning and/or replacement.

Furthermore, and as also previously described, even though the media of one or more filters may clog up, water is free to flow over the top of the layer, and thus permit the filtering process to continue. In the meantime, of course, the clogged filter may be removed for replacement or repair, also without interrupting the filtering process through the remainder of the filters. As also previously described, both the screens and the carrier may be made of any suitable, light weight material which is compatible with the water and which is non-corrosive and otherwise inexpensive.

As best shown in FIG. 4, and as previously described, the means for injecting air into a column of water on the upstream side of each filter comprises a tube 28 mounted on a bracket 29 releasably attachable to a side 12 of the tank at the upstream side of each filter, and an air line 30 of plastic of the like which extends into the tube 28 and which has an airstone 31 on its lower end adjacent the lower end of the tube, so as to inject air into the tube for passage upwardly substantially the entire length of the tube 28 prior to passing outwardly through the open upward end of the tube. As shown, the open lower end 32 of the tube is cut on a bias to provide optimum access of the water to the airstone, and the open upper end 33 of the tube opens to one side thereof. As also previously described, it is preferred that the tube be so mounted that the water level in the tank is substantially intermediate the upper and lower limits of the open upper end of the tube, and the tube is preferably of such length that its lower end is near the lower end of the tank as can be seen from FIG. 2. The bracket has a series of holes there through, as shown in FIG. 4, to permit it to be mounted in a plurality of vertical positions with respect to the tank, and thus with its upper end at desired elevation with respect to the water level.

As also shown in the drawings, a similar means is also provided for injecting air into the upstream end of each of the compartments A and B, thereby further promoting the circulation of water within the compartment. Air is supplied to each air line 30 through a common air line 34.

Inasmuch as the alternative embodiment of the tank shown in FIG. 8, and indicated in its entirety by reference character 10A, is similar in many respects to the tank 10, many of its corresponding parts are indicated by the same reference character except for the addition of the suffix "A". Thus, for example, the tank is shown to be of elongate construction having vertical walls 11A at each end, oppositely facing side walls 12A, and a bottom wall 13A, which, as in the case of the tank 10, is preferably curved or of U shape to cause solid waste particles to accumulate at the lowest level therein. Also, pipes 14A from a raceway or breeding tank of the fish culture system extend through the inlet end wall 11A for introducing water from the system into the tank near its upper end. Still further, the water, following circulation through the tank, passes out of the tank through pipes 15A extending through the outlet end wall of the tank near its upper end for return to another component of the fish culture system and ultimately the raceway.

A weir 16A is mounted across and secured to the opposite side walls of the tank intermediate its ends to divide it into longitudinally successive compartments CA and DA. The weir has a slot therein whose lower edge is disposed at substantially the level of the inlet and outlet 14A and 15A so as to maintain a water level in the tank as indicated in broken lines. Water and waste material may be drained from each compartment through a drain pipe in the lowermost level of each compartment leading to a common drail line 18A. Standpipes 17CCA and 17DDA are removeably disposed in the upper ends of the drain pipes so as to normally close them.

If desired, additional compartments containing baffles may be arranged in a forward extension of the tank upstream of the compartments CA and DA. As previously noted in connection with the tank 10, these baffles may be useful in promoting settlement of waste material upstream of the compartment CA and DA.

As in the case the compartments C and D of the tank 10, compartments CA and DA of the tank 10A are for the purpose of removing dissolved organic substances in the water by bacterial growth. Thus, as shown, a plurality of filters 22A are mounted in upright and spaced apart positions across the tank within each compartment, with the side and bottom edges of the filters conforming closely and being secured to the side walls and bottom of the tank, and with the upper edges of the filters slightly above the water level, so that water passing through the tank will circulate successively through the filters, at least until such time that the filters are clogged, at which time the water level will rise sufficiently upstream for that filter to pass over its upper edge.

As in the case of the filters of the tank 10, each filter 22A includes a relatively thin layer of porous filtering material on which bacteria from the dissolved organic substances in the water will grow. Although not shown in FIG. 8, the filters 22A also preferably include screens on opposite sides of the filtering media and secured thereto by means of a frame, as shown in FIGS. 3, 5, 6 and 7, except that the frames do not extend upwardly to provide hand holes for facilitating raising and lowering of the filters.

In still other respects, the filters are similar to those previously described in that the layer of filtering material may comprise woven or fiberglass matting which provides surface areas many times that of the area on the face of the layer. Also, of course, and again as previously described, clogged filters may be removed for replacement or repair, without interrupting the filtering process through the remainder of the filters.

The means for injecting air into the water in the upstream side of each filter is similar to that described in connection with the tank 10 in that it comprises a tube 28A releaseably mounted on a side of the tank and an air line 30A of plastic of the like which extends into the tube and which has an airstone 31A on its lower end adjacent the lower end of the tube to inject air into the tube for passage upwardly substantially the entire length of the tube prior to passing outwardly through the open upper end of the tube. Also, and as shown, the open lower end 32A of the tube 28 is cut on a bias to provide optimum access of the water to the airstone, and the upper, outlet end 33A of the tube opens at substantially the water level in the tank. As shown, and as previously described, the tube is preferably of such length that its lower end is near the lower end of the tank.

The tubes 28A differ from tubes 28, however, in that their inlet ends are disposed in the downstream side of each filter so that air lines 30A inject air into water which has already circulated through that filter. That is, as shown in FIG. 8, the major portion of each tube is mounted on the downstream side of the filter, and has an upper end which extends forwardly over the upper edge of the filter, and whose open end faces downwardly at the water level just upstream of the upper edge of the filter. Thus, this arrangement of the air injecting tubes enables even greater aeration of the water. Air is supplied to each of the air lines 30A by means of a common air line 34A leading from a suitable source of air.

The embodiment of filter tank 10B shown in FIG. 9 is similar to the tank 10A of FIG. 8 so many of its parts are designated by the same reference characters except for the use of the suffix "B" in place of "A". Thus, for example, the tank is of elongate construction and has a front or inlet end wall 11B through which one or more pipes 14B extend from a breeding tank or raceway $R_B$ for introducing water from the raceway into the tank 10A at its inlet end. Following circulation through and out of the tank through outlet pipes, as shown in FIG. 8, the water may be delivered to another component of this system and ultimately to the raceway for recirculation through the tank 10B.

As in the case of tank 10A, a plurality of filters 22B are mounted in upright and spaced apart positions across the tank within each compartment thereof, with the side and bottom edges of the filters conforming closely to the side walls and bottom of the tank, and with the upper edges of the filters slightly above the water level, so that water passing through the tank will circulate successively through the filters, at least until such time that the filters are clogged, at which time the water level will rise sufficiently upstream for that filter to pass over its upper edge. Each of the filters 22B is preferably of the construction previously described in connection with FIGS. 1 to 8.

Tank 10B is also similar to tank 10A in that it incudes means for injecting air into the water on the upstream side of each filter 22B in the form of an air line 28B releaseably mounted on a side of the tank and a tube 30B of plastic of the like which extends into the tube 28B and which has an airstone 31B on its lower end adjacent the lower end of the tube to inject air into the tube for passage upwardly substantially the entire length of the tube 28B prior to passing outwardly through the open upper end of the tube. As in the case of the tubes 28A, the tubes 28B have lower inlet ends 32B disposed in the downstream side of each filter and inlet ends 33B which open on the upstream side of each filter at the water level in the tank so that they inject air into water which has already circulated through that filter. That is, as in the case of FIG. 8, the major portion of each tube 28B is mounted on the downstream side of the filter, and has an upper end which extends forwardly over the upper edge of the filter, and whose open end 33B faces downwardly at the water level just upstream of the upper edge of the filter. Air is supplied to each of the air lines 30B by means of a common air line 34B leading from a suitable source of air.

Each of the inlet pipes 14B to the tank 10B includes an upright section 40 which extends through a bottom wall of the raceway RB near the rear end thereof. More particularly, the upright end 40 of each pipe 14B is open at its upper end within raceway RB to maintain the water level therein and is surrounded by an outer tube 41 which extends above the water level and which has a screen 42 at its lower end to prevent fish in the raceway from passing into the pipe 14B.

Air is injected into the upright section 43 of the outlet end of each of the inlet pipes 14B by means of an air line 44 which may receive air from the common line 34B. More particularly, air is introduced into the pipe 14B through a loadstone on the lower end of an air line located approximately intermediate the upper and lower ends of the upright section 43. This injection of air into the inlet pipe thus assists in causing water to be circulated from the raceway into the filter tank with substantially no hydraulic loss, and thus maintaining the water at a level within tank 10B approximately vertically midway of a horizontal section 45 of the pipe which extends through wall 11B of tank 10B.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is;

1. Apparatus for use in removing waste from a fish culture system, comprising a tank through which water from th system may be circulated and having an inlet thereto and outlet therefrom, a plurality of filters mounted in upright and spaced apart positions across the tank intermediate the inlet and outlet with their side and bottom edges conforming closely to the side and bottom walls of the tank so that the water circulates successibly through them, each filter including a relatively thin, porous layer of filtering media having a large surface area on which bacteria form dissolved organic substances in the water will grow, means for injecting air into a column of water on the upstream side of each filter so as to agitate the water and add oxygen thereto for promoting bacterial growth on the filter media, means for maintaining the water in the tank at substantially the level of the upper edges of the layers of filter media, and means providing for individual removal of each such layer of filter media from the tank for cleaning purposes indepenedently of the others, the means for injecting air on the upstream side of each filter including a tube individually mounted on the tank with an outlet on said upstream side and an inlet in its lower end on the downstream side of the filter near the bottom of the tank, and an air line extending into the tube for injecting air into the water near its lower end.

2. Apparatus of the character defined in claim 1, wherein the water level maintaining means includes a weir in the tank upstream of at least certain of the filters.

3. Apparatus of the character defined in claim 2, including baffles arranged within the tank upstream of the weir to promote the settling of solid waste particles from the water.

4. Apparatus of the character defined in claim 1, wherein each filter includes screens on opposite sides of the layer of filter media.

5. Apparatus of the character defined in claim 1, wherein the inlet to the tank includes a pipe having an end section extending horizontally through an end wall thereof, an upright section leading to the end section, and means for injecting air into the upright section generally intermediate its upper and lower ends.

6. Apparatus of the character defined in claim 5, wherein water in the tank is maintained at a vertically intermediate the inlet end section.

7. Apparatus of the character defined in claim 1, wherein the fish culture system includes a raceway in which fish may be bred, the tank inlet being connected as part of the system donwstream of the raceway and the tank outlet being connected as part of the system upstream of the raceway, and means external to the tank for circulating water through the system.

8. Apparatus of the character defined in claim 7, wherein the inlet to the tank includes a pipe having an end section extending horizontally through an end wall of the tank and an upright section at its other end which extends vertically through the bottom wall of the raceway and has an open upper end to provide an outlet from the raceway.

9. Apparatus of the character defined in claim 8, wherein said upright section at the other end of the inlet pipe is surrounded by a pipe whose upper end is above the water level and whose lower end connects to the bottom wall of the raceway by a screen.

10. Apparatus of the character defined in claim 9, wherein water in the tank is maintained at a vertically intermediate the diameter of the inlet end section.

11. Apparatus for use in removing waste from a fish culture system, comprising a tank through which water from the system may be circulated and having an inlet thereto and outlet therefrom, a plurality of filters mounted in upright and spaced apart positions across the tank intermediate the inlet and outlet so that the water circulates successively through them, each filter including a relatively thin, porous layer of filtering media having a large surface area on which bacteria from dissolved organic susbstances in the water will grow, means for injecting air into a column of water on the upstream side of each filter so as to agitate the wate and add oxygen thereto for promoting bacterial growth on the filter media, means for maintaining the water in the tank at substantially the level of the upper edges of the layers of filter media, and means providing for removal of said layers of filter media from the tank for cleaning purposes, the means for injecting air on the upstream side of each filter including a tube mounted on the tank with an outlet on said upstream side of the filter and an inlet in its lower end near the bottom of the tank and on the downstream side of the filter, and an air line extending into the tube for injecting air into the water near its lower end.

* * * * *